United States Patent
Wickham et al.

[11] Patent Number: 6,016,371
[45] Date of Patent: Jan. 18, 2000

[54] OPTICAL RF SIGNAL PROCESSING

[75] Inventors: Michael G. Wickham, Rancho Palos Verdes; Philip H. Wisseman, Hermosa Beach, both of Calif.

[73] Assignee: TRW Inc., Redondo Beach, Calif.

[21] Appl. No.: 08/994,344

[22] Filed: Dec. 19, 1997

[51] Int. Cl.$^7$ ............................................. G02B 6/28
[52] U.S. Cl. ............................ 385/10; 385/2; 385/24
[58] Field of Search ................................ 385/2, 10, 15, 385/18, 24

[56] References Cited

U.S. PATENT DOCUMENTS

| | | | |
|---|---|---|---|
| 3,937,557 | 2/1976 | Milton | 350/96 C |
| 3,969,687 | 7/1976 | Freiberg et al. | 331/94.5 |
| 4,315,666 | 2/1982 | Hicks, Jr. | 350/96.15 |
| 4,358,851 | 11/1982 | Scifres et al. | 372/97 |
| 4,444,502 | 4/1984 | Ljung | 356/350 |
| 4,475,790 | 10/1984 | Little | 350/96.21 |
| 4,530,097 | 7/1985 | Stokes et al. | 372/6 |
| 4,545,644 | 10/1985 | DeVeau, Jr et al. | 350/96.21 |
| 4,564,262 | 1/1986 | Shaw | 350/96.15 |
| 4,680,767 | 7/1987 | Hakimi et al. | 372/6 |
| 4,708,424 | 11/1987 | Marhic | 350/96.16 |
| 4,780,877 | 10/1988 | Snitzer | 372/6 |
| 4,782,491 | 11/1988 | Snitzer | 372/6 |
| 4,818,109 | 4/1989 | Hutchings et al. | 356/350 |
| 4,938,556 | 7/1990 | Digonnet et al. | 350/96.15 |
| 4,955,025 | 9/1990 | Mears et al. | 372/6 |
| 4,964,131 | 10/1990 | Liu et al. | 372/6 |
| 4,997,247 | 3/1991 | Stowe | 350/96.15 |
| 5,323,415 | 6/1994 | Quast et al. | 372/94 |
| 5,373,383 | 12/1994 | LaGasse | 359/161 |
| 5,425,039 | 6/1995 | Hsu et al. | 372/6 |
| 5,428,218 | 6/1995 | Toughlian et al. | 250/227.12 |
| 5,446,809 | 8/1995 | Fritz et al. | 385/17 |
| 5,469,455 | 11/1995 | Reitz et al. | 372/20 |
| 5,504,771 | 4/1996 | Vahala et al. | 372/94 |
| 5,583,516 | 12/1996 | Lembo | 342/375 |
| 5,761,351 | 6/1998 | Johnson | 385/15 |
| 5,777,778 | 7/1998 | Yao | 359/245 |
| 5,838,851 | 11/1998 | Wisseman et al. | 385/32 |
| 5,852,687 | 12/1998 | Wickham | 385/14 |

*Primary Examiner*—John D. Lee
*Assistant Examiner*—Victoria D. Hao
*Attorney, Agent, or Firm*—Michael S. Yatsko

[57] ABSTRACT

An RF optical signal processing system that can provide various filter functions by way of tapped delay lines with fiber Bragg gratings, variable weight taps, positive and negative taps and a short coherent length optical source. Such an RF optical signal processing systems is advantageous over corresponding RF electronic systems and offer the increased bandwidth and lower power consumption making the RF optical signal processing system suitable for various application such as avionics and satellite communications.

33 Claims, 6 Drawing Sheets

OPTICAL RF SIGNAL PROCESSING

BACKGROUND OF THE INVENTION

1. Field of the Invention

The present invention relates to an optical RF signal processing system and more particularly, to an RF optical signal processing system that is adapted to provide a variety of filter functions by way of tapped delay lines with fiber Bragg gratings, variable weight taps, positive and negative taps, and a short coherent length optical source.

2. Description of the Prior Art

Optical signal processing systems are known to provide distinct advantages over RF signal processing systems. These advantages include: increased communication speed, reduced power consumption, reduced size and thus reduced weight and increased bandwidth. Because of these advantages, such optical processing systems are becoming increasingly popular for use in certain applications, such as satellite communication systems and avionics systems where electrical power dissipation and bandwidth are crucial factors. In fact, various avionics standards, such as ARINC 629 and DOD-STD-1773, have been developed for using optical processing systems aboard aircraft. Unfortunately, as recognized in "*Digital Avionics Systems Principals and Practice*", second edition, by Kerry R. Spitzer, McGraw Hill, Inc. 1993, pp. 42, sufficient optical devices have not been developed to enable the heavier and power hungry electronics components to be completely replaced. As such, various electronic components are still being used in avionics application.

SUMMARY OF THE INVENTION

It is an object of the present invention to solve various problems in the prior art.

It is yet another object of the present invention to provide an optical RF signal processing system which enables analogous electronics apparatus to be replaced.

Briefly, the present invention relates to an RF optical signal processing system that can provide various filter functions by way of tapped delay lines with fiber Bragg gratings, variable weight taps, positive and negative taps and a short coherent length optical source. Such an RF optical signal processing system is advantageous over corresponding RF electronics systems and offers the increased bandwidth and lower power consumption making the RF optical signal processing system suitable for various applications, such as avionics and satellite communications.

DESCRIPTION OF THE DRAWINGS

These and other objects of the present invention will be readily understood with reference to the following specification and attached drawings wherein.

DETAILED DESCRIPTION

The present invention relates to an RF optical signal processing system, suitable in applications where large bandwidth and low power consumption are important, such as avionics and satellite communications applications.

The RF optical signal processing system, illustrated in FIGS. 1a–1d includes tapped delay lines with fiber Bragg gratings. Alternate embodiments of the invention with positive and negative taps, variable weight taps and variable phase taps are discussed connection with FIGS. 3–5, respectively. A short coherent optical source for use with the invention is illustrated in FIG. 2.

FIGS. 1a–1d illustrate an RF optical signal processing system in accordance with the present invention that is adapted to be utilized to perform a variety of optical filter functions, such as band pass filters, notch filters, equalization filters, and the like. In addition to having lower electrical power consumption and increased bandwidth, the RF optical signal processing system in accordance with the present invention is also adapted to operate at higher frequencies and is less costly and are lighter in weight than its electronic counterpart.

Figure 1A:
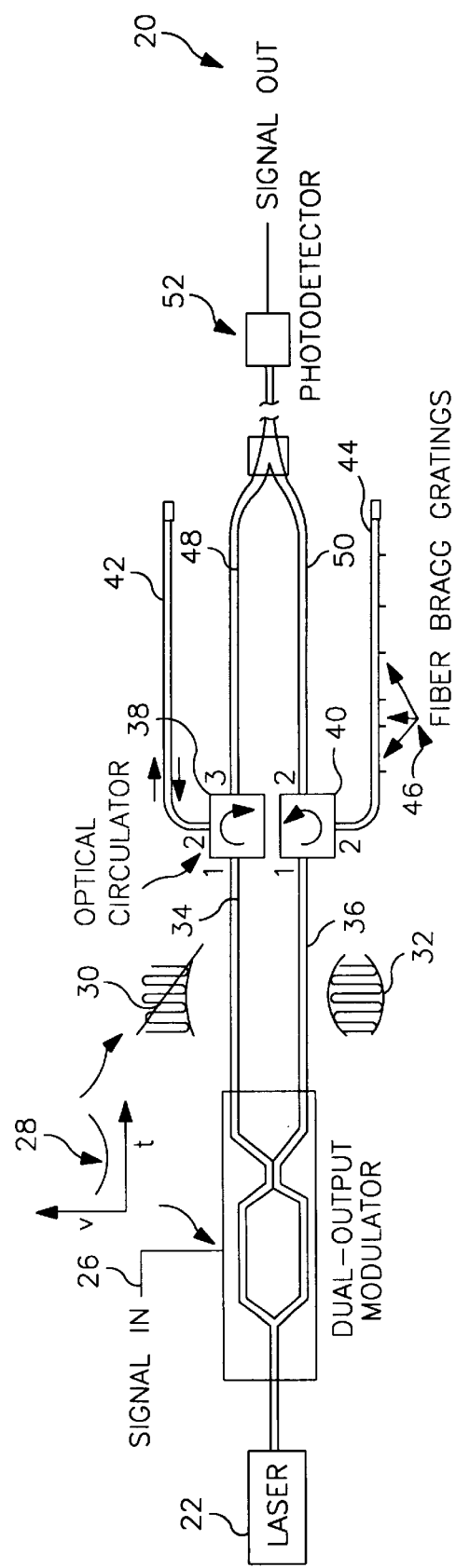
FIGS. 1a–1d are schematic representations of four alternate RF optical signal processing systems in accordance with the present invention.

Referring to FIG. 1a an RF optical signal processing system according to a first embodiment of the invention, generally identified with the reference numeral 20, is illustrated. The RF optical signal processing system includes a source 22 for generating an optical carrier signal, such as a short coherence length optical source. The optical carrier source 22 is discussed in detail below in connection with FIGS. 2a and 2b. The optical carrier signal is applied to an optical input of a dual output optical modulator 24, such as a Mach-Zehnder modulator. An example of such a Mach-Zehnder dual output modulator is discussed in "*Accelerated Aging of APE Waveguides*," in Journal of Lightwave Technology, Vol. 13 no. 7, July, 1995, pp. 1523, hereby incorporated by reference. An RF signal 26 is applied to an RF input of the modulator 24. As shown, an exemplary RF signal, identified with the reference numeral 28, is applied to the RF input of the modulator 24. As will be discussed in more detail below, the modulator 24 is configured to provide complementary RF modulated optical signals, generally identified with the reference numerals 30 and 32. A pair of optical lines 34 and 36, such as single mode fiber optic cables, are coupled to the outputs of the modulator 24. The lines 34 and 36 are applied to a pair of optical circulators 38 and 40. In particular, the optical line 34 is coupled to an input port 1 of the optical circulator 38 while the optical line 36 is optically coupled to port 1 of the optical circulator 40. A pair of tapped delay lines 42 and 44 are coupled to port 2 of the optical circulators 38 and 40, respectively. The tapped delay lines 42 and 44 each include a fiber-optic cable with one or more Bragg gratings, generally identified with the reference numeral 46, written at different spacings along the tapped delay lines 42 and 44 for the same or different wavelengths as discussed below in more detail. The tapped delay lines 42 and 44 thus reflect a portion of the optical signal corresponding to the wavelength for which the Bragg grating corresponds and transmit the remaining portions. The reflected optical signals from the tapped delay lines 42 and 44 re-enter port 2 of the optical circulators 38 and 40 respectively, and exit port 3 along lines 48 and 50 and are combined at a photodetector 52 to perform the desired filter function.

Figure 1B:
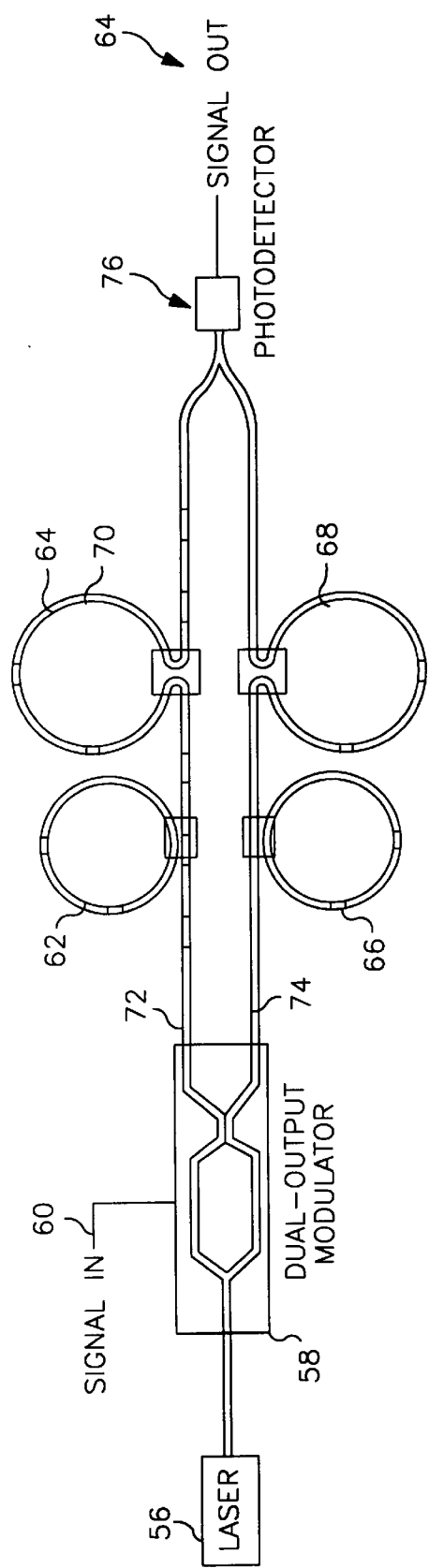

FIG. 1b illustrates an alternate embodiment of the RF optical signal processing system illustrated in FIG. 1a and is generally identified with the reference numeral 54. In this embodiment, a source 56 of an optical carrier frequency, such as a laser, is applied to a dual output optical modulator 58, for example, a Mach-Zehnder modulator, along with an RF input signal 60. The complementary outputs from the modulator 58 are applied to a series of recursive and non-recursive loop elements 62, 64, 66 and 68, each including one or more Bragg gratings, generally identified with the reference numeral 70. More particularly, an output line 72 may be optically coupled to the recursive loop element 62 which, in turn is coupled to the non-recursive loop element 64. Similarly, the output line 74 is optically coupled to the recursive loop element 66 which, in turn, is coupled to the non-recursive loop element 68. Each of the loop elements 62, 64, 66, 68 may be formed from a fiber-optic cable with Bragg gratings written for various wavelengths at different spacings around the loop depending on the desired delay and filter function. The output lines 72 and 74 are combined at a photodetector 76 where the intensities of the signals in the two lines are added in order to form the desired filter function.

It is to be understood with respect to FIG. 1b, that although specific configurations for the loop elements 62, 64, 66 and 68 are shown, other combinations are possible and are within the broad scope of the present invention. For example, the loop elements 62 and 66 are illustrated as recursive loop elements while the loop elements 64 and 68 are illustrated as non-recursive loop elements. Alternately, the output line 72 and 74 may each be coupled to only a single loop element, which may either be a recursive element or a non-recursive element. The output lines 72 and 74 may also be coupled to 3 or more elements, which may be configured the same (i.e. recursive or non-recursive) or differently. All such embodiments are considered to be within the broad scope of the present invention.

Figure 1C:
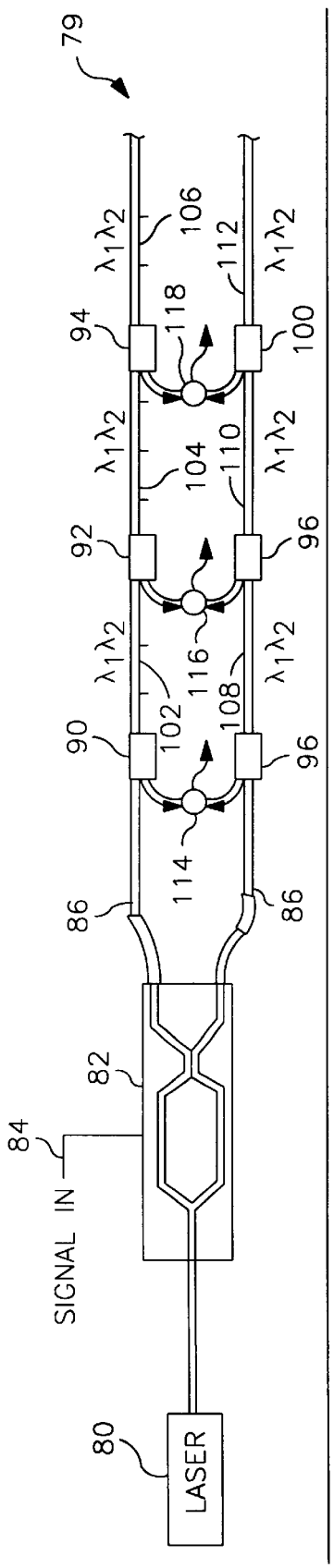

FIG. 1c illustrates another alternate embodiment of the RF optical signal processing system, generally identified with the reference numeral 78. In this embodiment, a source 80 for an optical carrier signal, for example from a short coherence length optical source, is applied to a dual output optical modulator 82 along with an RF input signal 84. In this embodiment, each of the complementary outputs 86 and 88 of the modulator 82 are applied to a series of stages of optical circulators 90, 92, 94, 96, 98, 100 and tapped delay lines 102, 104, 106, 108, 110 and 112. Each tapped delay line 102, 104, 106, 108, 110 and 112 includes one or more Bragg gratings, generally identified with the reference numeral 114 spaced along the tapped delay lines 102, 104, 106, 108, 110 and 112 written for a specific wavelength to perform the desired filter function. The optical circulators 92, 94, 96, 98 and 100 isolate all of the reflected light from the tapped delay lines, 102, 104, 106, 108 110 and 112. The reflected light from each pair 102/108, 104/110 and 106/112 of tapped delay lines is coupled by the optical circulators 114, 116 and 118, which, in turn, are input into a NXI power combiner whose output is coupled to a photodetector (not shown) to perform the desired filter function.

Figure 1D:
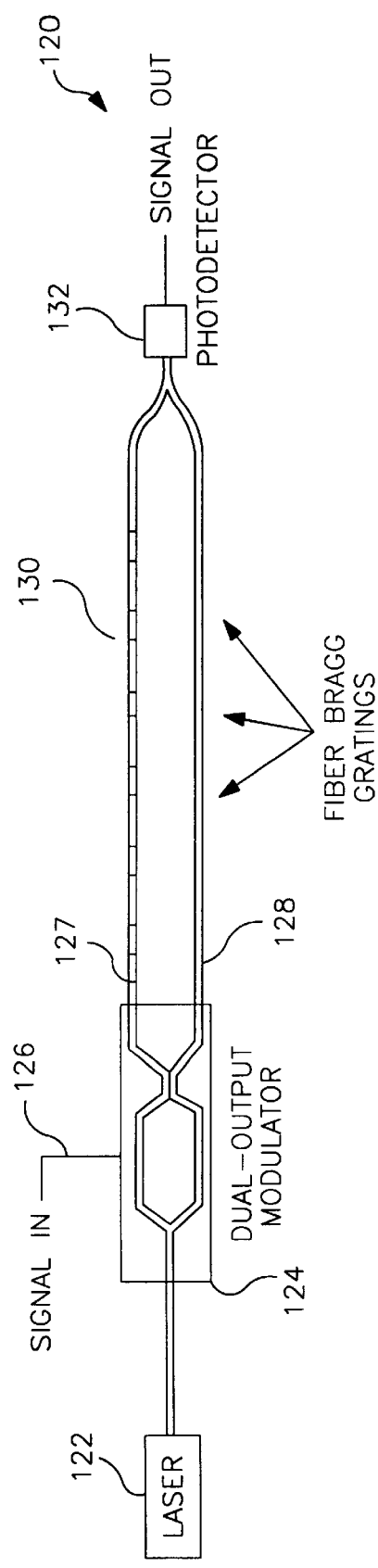

A fourth embodiment of the RF optical signal processing system in accordance with the present invention is illustrated in FIG. 1d and generally identified with the reference numeral 120. In this embodiment, a source 122 of an optical carrier frequency, such as a short coherence length optical source, is applied to an input of a dual output optical modulator 124, along with an RF signal 126. The dual outputs of the modulator 124 are applied to a pair of tapped delay lines 126 and 128. In this embodiment, each of the tapped delay lines 126, 128 includes a plurality of Bragg gratings, generally identified with the reference numeral 130, written for specific wavelengths at different lengths along the tap delay lines 126 and 128. In this embodiment, unlike the embodiments illustrated in FIGS. 1a–1c, the transmission, rather than the reflection, of the complementary output signals are combined at a photodetector 132 to perform the desired filter function.

Figure 2A:
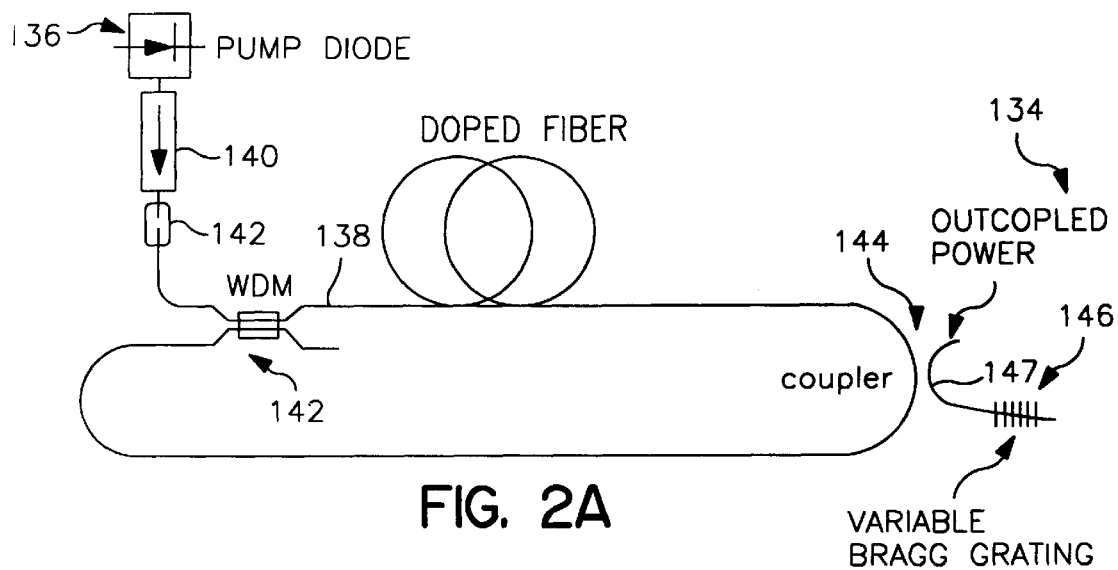
FIGS. 2a and 2b are schematic diagrams of a short coherent length optical source in accordance with the present invention.
Figure 2B:
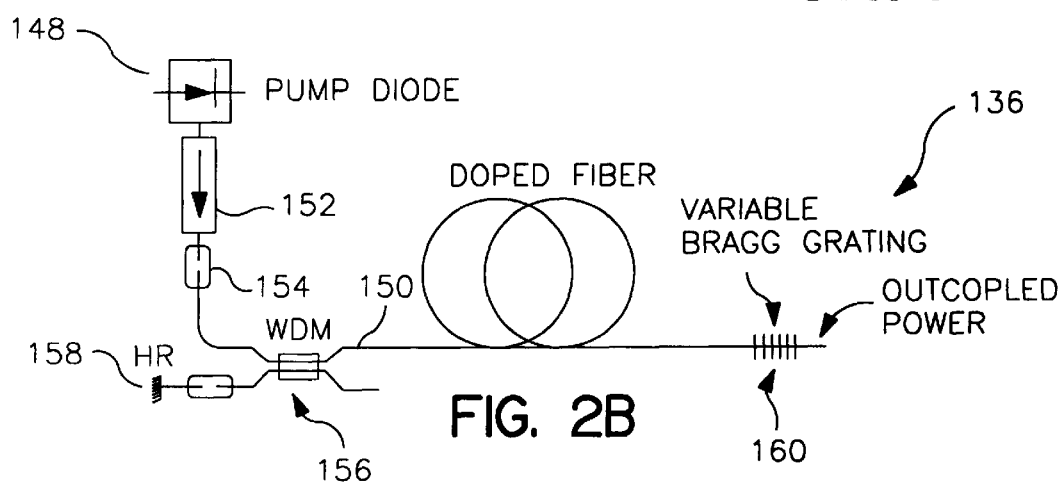

FIGS. 2a and 2b illustrate a short coherence length optical source adapted to be utilized with the optical signal processing systems 20, 54, 78 and 120 illustrated in FIGS. 1a–1d. Otherwise, coherent optical combination of the various time delay signals at the photodetector would create unwanted optical intensity modulation which would obscure the desired filter function. As such, the optical sources illustrated in FIGS. 2a and 2b, generally identified with the reference numerals 134 and 136, respectively, are adapted to be utilized as the short coherence length optical source 22, 56, 80 and 122, illustrated in FIGS. 1a–1d, respectively.

Each of the optical sources 134 and 136 includes a Bragg grating outcoupler and a relatively long cavity length, inherent in fiber-optic lasers. The Bragg grating outcouplers serve to define the spectral width of the output power and thus the local coherence length. Coherence length is provided by Equation (1) below:

$$L_{coherence} = c/(n\Delta v), \quad (1)$$

where c is the speed of light in a vacuum, n is the index of refraction in the fiber laser, and $\Delta v$ is the Bragg grating spectral width.

Within this spectral width, the lazing spectra is not continuous but is made up of a plurality of individual modes separated in frequency by the cavity mode spacing $\delta v = c/(nL_{cavity})$, where $L_{cavity}$ is the cavity or local coherence length. The laser will display coherence for the cavity length equal to $L_{coherence}$. After a distance equal to the cavity length, the laser will again be coherent for a length $L_{coherence}$. The fiber-optic cavity length defines a length over which the source is considered to have the coherence length $L_{coherence}$. The tapped delay lines at the outputs of the dual output modulators 24, 58, 82 and 124, illustrated in FIGS. 1a–1d, are shorter than the coherence length $L_{coherence}$. Since fiber lasers can be tens of meters in length, the restriction does not limit the usefulness of the invention.

FIG. 2a is configured as a fiber-optic ring laser and includes a pumped source 136, such as a diode laser, for example, as discussed in detail in "*Rare Earth Doped Fiber Lasers and Amplifiers*, by Michel J. F. Dinonnet, Marcel Dekker, Inc., 1993, page 267, hereby incorporated by reference. The pumped source 136 is optically coupled to a doped fiber 138, for example, by way of a single mode fiber 140, an optical coupling device 142 and a wavelength division multiplexer optical coupler 142. The doped fiber 140 forms the lazing cavity and may be formed from a doped fiber 2000 cm in length. The doped fiber 138 is connected to two ports of the optical coupler 142 forming a ring. The doped fiber 138 is optically coupled to an outcoupler 144 which includes a coupling line 147 which receives light from the doped fiber 138. The outcoupler is an evanescent power splitter as is common in the industry. The coupling line 147 includes a variable Bragg grating 146, written into the coupling line 147 for a particular wavelength at a particular distance. The Bragg grating 146 causes light to be reflected back to the doped fiber feedback loop make lazing unidirectional and also defines the spectral bandwidth of the output.

The fiber optic laser 136 illustrated in FIG. 2b is a standing wave doped fiber laser, for example, as discussed in detail in "*Rare Earth Doped Fiber Lasers Amplifier,*" by Michel J. F. Dinonnet, Marcel Dekker, Inc., 1993, page 267, hereby incorporated by reference. The short coherence length optical source 136 includes a pump supply 148, which may be coupled to a doped fiber 150 by way of a single-mode optical fiber 152, an optical coupler 154 and an optical coupler 156. One port of the optical coupler 156 is coupled to a high reflectivity mirror 158, which forms an optical amplifier. The doped optical fiber 150 is coupled to a variable Bragg grating outcoupler 166 which defines the spectral bandwidth.

The cavity length in both lasers 136 and 164 can be as long as required to satisfy the requirement that the cavity length be longer than the RF optical signal processing circuit. In both embodiments, the Bragg gratings 146, 160 may be disposed on either a heater or a piezo pad (not shown) to shift the output center wavelength of the short coherence length optical source to access different taps in the tapped delay lines illustrated in FIGS. 1a–1d to vary the wavelength position of the Bragg grating reflectivity spectrum as discussed below. In this way the output center wavelength can be varied. The tapped delay lines can have sets of Bragg gratings with each set written for one wavelength and designed to perform a particular filter function. In this way different filter functions can be quickly accessed by simply changing the wavelength of the optical carrier.

Figure 3:
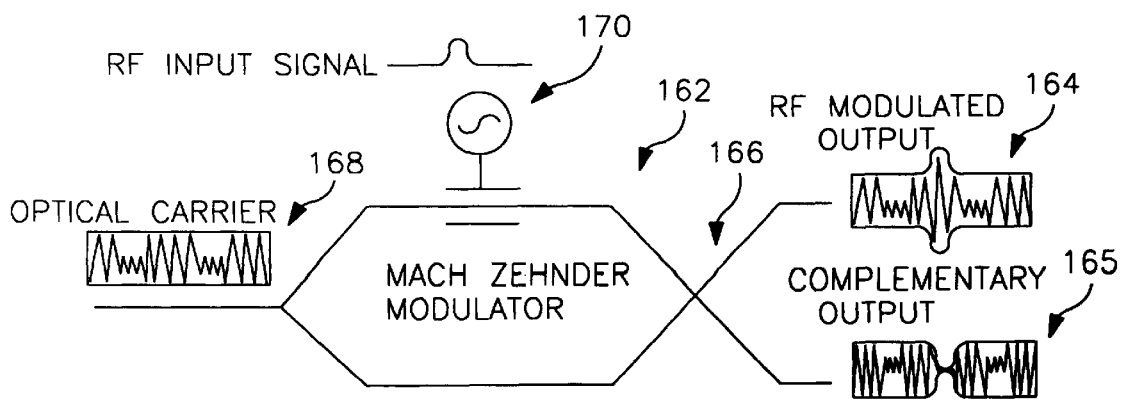
FIG. 3 is a schematic diagram of a complementary output optical modulator in accordance with the present invention.

In order to accomplish some filter functions, such as band-pass, high-pass and equalization, negative tapped weights are required. In an electrical analog circuit, such negative tap weights are easily accomplished because the contribution from the various taps in the filter are added together coherently, the RF fields are added together. In an optical analog circuit, the optical intensity is added but the optical intensity can never be negative. In order to provide for negative tap weights in an optical system, a complementary output optical modulator 162 (FIG. 3) in accordance with an important aspect of the invention is provided. The complementary outputs of the optical modulator 162, identified with the reference numerals 164 and 166, may be obtained by utilizing a dual output Mach Zehnder modulator and replacing the usual Y-branch combiner with a 3 db coupler 166 as shown in FIG. 3 to form the complementary output optical modulator 162. An optical carrier 168 is applied to an optical input of the complementary output optical modulator 162. An RF input signal, generally identified with the reference numeral 170, is applied to an RF input port of the modulator 162 in order to modulate the RF signal onto the optical carrier 168 to generate a modulated optical signal, representative of the RF signal. As shown in FIG. 3, by combining the outputs of the Mach-Zehnder modulator 162 with a 3 db coupler, both an RF modulated optical signal 164 and its complement signal 165 are available which allows the negative tap function. When the two complementary output signals 164 and 165 are added they sum to no modulation.

Previous implementations of negative tap weights in an optical delay system have used a dual photodetector approach in which the detected signals are subtracted in the electrical domain. By utilizing a dual output port Mach-Zehnder modulator, the need for dual modulators is eliminated. By combining the outputs of the Mach-Zehnder modulator 162 optically, additional flexibility to the system is provided, such as transmission to remote locations or additional optical filtering.

The flexibility of RF optical filters requires variable weight complex taps; taps in which the reflectivity (amplitude) and phase can be varied in order to alter the function of the filter. A change in the amplitude of a tap can be accomplished by shifting the in-wavelength the reflectivity spectrum of the Bragg grating relative to the fixed wavelength of the optical carrier. This can be accomplished by varying the optical pathlength spacing in the grating. Maximum reflectivity of a fiber optic Bragg grating is at the Bragg center wavelength given by equation one below:

$$\lambda_{Bragg} = 2n\Delta L, \quad (1)$$

where N is the index of refraction of the fiber optic core at the optical carrier wavelength, and $\Delta L$ is the physical spacing of the index modulation within the core.

Both N and $\Delta L$ can be changed in one of two ways. More particularly, the grating can be placed on a heater to heat the grating. In this case, the index of refraction is modified through the temperature dependence of the index of refraction while $\Delta L$ is changed through the co-efficient of expansion of the fiber optic core. The combination of these two effects modify the Bragg center wavelength as illustrated in equation 2.

$$\Delta \frac{\lambda_{Bragg}}{\lambda_{Bragg}} = \left( \frac{1}{n} \cdot \frac{d}{dT^n} + \frac{1}{L} \cdot \frac{d}{dT^L} \right) \cdot \Delta T \quad (2)$$

Figure 4A:
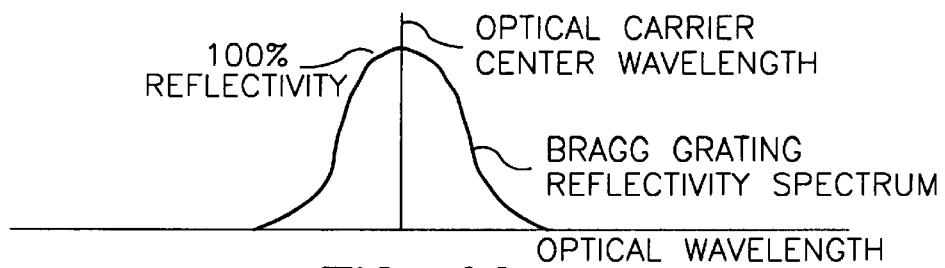
FIGS. 4a–4d are graphical illustrations illustrating the change in reflectivity of a Bragg grating from 100% reflectivity to 0% as stretching or temperature increases for a variable weight optical tap in accordance with the present invention.
Figure 4B:
Figure 4C:
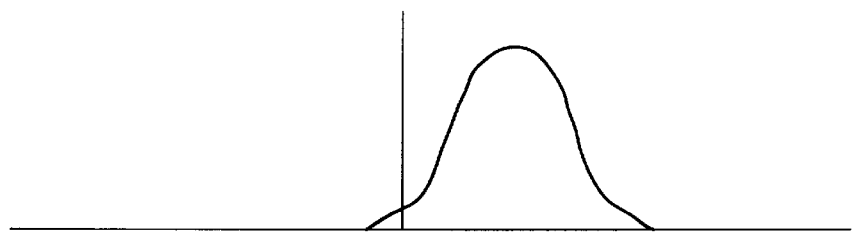
Figure 4D:
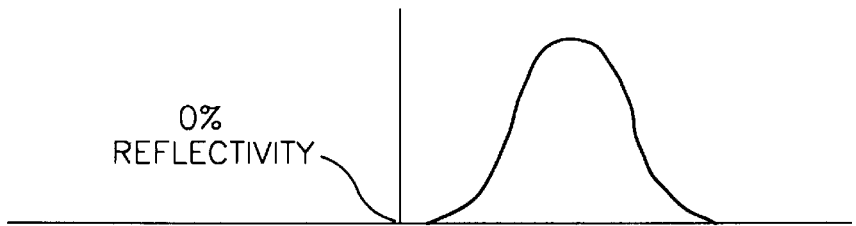

The index of refraction and length can also be changed stretching the grating by way of a piezo electric pad. The index is changed through a stress induced change in the index of refraction. The length is also physically changed by the stretching action. In both cases, the Bragg center wavelength changes relative to the fixed wavelength of the optical carrier as illustrated in FIGS. 4a–4d. When the optical carrier wavelength is equal to the Bragg center wavelength, the reflectivity is at a maximum of the grating, which can be very small or a 100% reflectivity. If the grating is stretched or heated to move the grating center wavelength very different from the optical carrier wavelength, the tap can be made to be virtually invisible to the optical carrier as illustrated in FIG. 4d.

Figure 5:
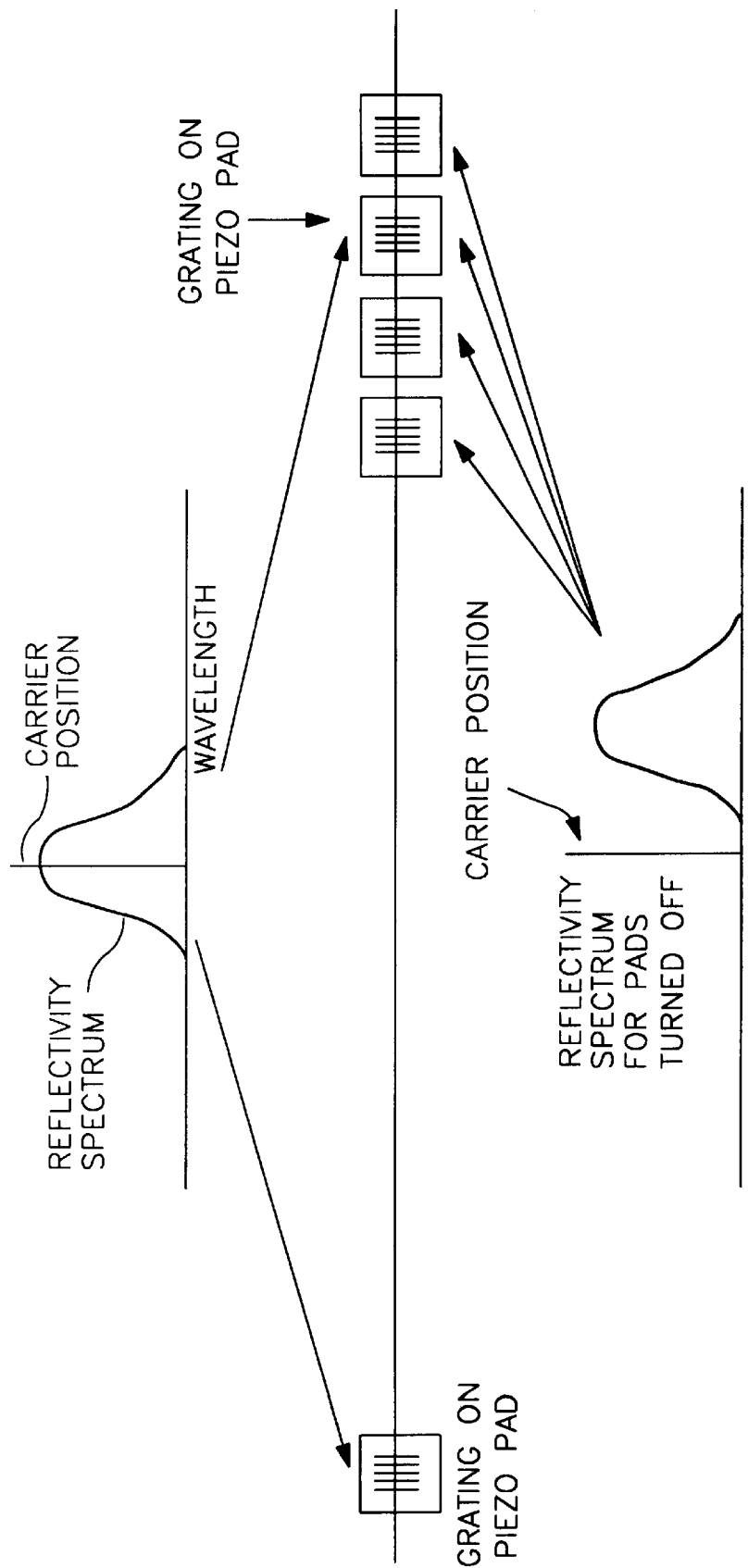
FIG. 5 is a graphical illustration illustrating the RF phase change of the RF optical signal processing system in accordance with the present invention.

The use of temperature or stretching of a Bragg grating is very effective for varying the amplitude of the tap but is not very effective for varying the RF phase. The phase is varied by changing the time delay of the RF signal through an increase or decrease in the optical pathlength. This pathlength change is relatively small when the grating is heated or stretched as discussed above and is thus not an effective method for modifying the phase of the tap. In order to provide a pathlength change, one of two techniques may be used in accordance with an important aspect of the invention as discussed below. First, the phase or time delay between successive taps can be effective by having a series of Bragg gratings all written at the same wavelength and all of which are on a temperature or piezo pad. A specific time delay will then be imposed when one of the gratings reflectivity spectrum is moved into the wavelength of the optical carrier as shown in FIG. 5. The initial grating in the tap delay line is a single grating. Subsequent gratings are actually a set of gratings, written with a reflectivity spectral width not coincident with the optical carrier wavelength. When the piezo pad or heater pad is turned on, one of the gratings is set, the Bragg center wavelength is moved into the position of the carrier wavelength so the optical signal reflects at the physical position of that grating. Several different time delays are possible in this way. The time delay variation or RF phase delay is the roundtrip time between the gratings in the gratings set. The weight of the tap can be set to other than the peak reflectivity depending on the filter function desired. Another technique for varying the phase is by providing a grating set wherein each tap is written at different Bragg grating center wavelengths. The first grating in the tap delay line could also be a set of gratings. Phase variation is accomplished by changing the wavelength of the optical carrier. Piezo or heater pads are required to vary the amplitude of the tap.

A third method for varying the phase is to use a relatively long (i.e. 2 cm) chirped grating. Over the length of the grating, the grating spacing varies linearly. The optical carrier reflection occurs at a point along the chirped grating where the grating correction meets the Bragg criterion, ΛBragg=2 n ΔL. This type of grating, however does not lend itself to variable weight changing. However, a fixed function RF filter, such as a notch or band pass filter function well and the capability of the phase variation allows the notch or band pass frequency to be varied by varying the phase of the taps. This method of phase variation also has the advantage that the notch center frequency could be continuously varied instead of indiscrete steps as in the other two phase variation methods discussed above.

Obviously, many modifications and variations of the present invention are possible in light of the above teachings. Thus, it is to be understood that, within the scope of the appended claims, the invention may be practiced otherwise than as specifically described above.

What is claimed and desired to be covered by a Letters Patent is as follows:

1. An RF optical signal processing system comprising:
   a source of an optical carrier;
   an optical modulator having an optical input port for receiving said source of an optical carrier and an RF input port for receiving an RF signal, said optical modulator having dual output ports and generating complementary modulated output signals;
   one or more tapped delay lines, optically coupled to one or more of said dual output ports of said output modulator;
   a pair of output lines, optically coupled to each of said dual output ports of said optical modulator and said one or more tapped delay lines; and
   a photodetector which combines the outputs from said pair of output lines.

2. The RF optical signal processing system as recited in claim 1, wherein said one of said one or more tapped delay lines include an optical circulator having an input port, a first output port and a second output port, said input port coupled to one of said complementary output of said optical modulator, said first output port coupled to a Bragg grating and said second output port coupled to said photodetector.

3. The RF optical signal processing system as recited in claim 1, wherein said one or more tapped delay lines include one or more loop elements.

4. The RF optical signal processing system as recited in claim 3, wherein said one or more loop elements include a recursive loop element.

5. The RF optical signal processing system as recited in claim 3, wherein said one or more loop elements include a non-recursive loop element.

6. The RF optical signal processing system as recited in claim 3, wherein each of said one or more tapped delay lines include different types of loop elements.

7. The RF optical signal processing system as recited in claim 1, wherein said one or more tapped delay lines includes one or more stages, each stage including an optical circulator and one or more Bragg gratings.

8. The RF optical signal processing system as recited in claim 7, further including optical isolators for optically isolating reflected light from each stage.

9. The RF optical signal processing system as recited in claim 1, wherein said one or more tapped delay lines include a fiber optic Bragg grating coupled to one of said complementary outputs of said optical modulator.

10. The RF optical signal processing system as recited in claim 1, wherein said source of an optical carrier is a short coherence length optical source.

11. The RF optical signal processing system as recited in claim 10, wherein said short coherence length optical source includes a fiber optic ring laser.

12. The RF optical signal processing system as recited in claim 10, wherein said short coherence length optical source includes a standing wave fiber optic ring laser.

13. The RF optical signal processing system as recited in claim 1, further including a coupler, said coupler being coupled to said dual output ports of said optical modulator to provide complementary output signal.

14. The RF optical signal processing system as recited in claim 1, wherein said one or more tapped delay lines provide a positive tap weight.

15. The RF optical signal processing system as recited in claim 1, wherein said one or more tapped delay lines provide a negative tap weight.

16. The RF optical signal processing system as recited in claim 1, wherein said one or more tapped delay lines include a plurality of Bragg gratings.

17. The RF optical signal processing system as recited in claim 16, wherein said Bragg grating is mounted on a heater pad.

18. The RF optical signal processing system as recited in claim 16, wherein said Bragg grating is mounted on a piezo pad.

19. The RF optical signal processing system as recited in claim 16, wherein said Bragg gratings are written for the same wavelength and said Bragg gratings mounted on a heater pad.

20. The RF optical signal processing system as recited in claim 16, wherein said Bragg gratings are written for the same wavelengths and said Bragg grating mounted on a piezo pad.

21. The RF optical signal processing system as recited in claim 16, wherein said Bragg gratings are written for different wavelengths and said Bragg gratings mounted on a heater pad.

22. The RF optical signal processing system as recited in claim 16, wherein said Bragg gratings are written for different wavelengths and said Bragg gratings mounted on a piezo pad.

23. An RF optical signal processing system comprising;
   a source of an optical carrier;
   an optical modulator having an optical input port for receiving said source of said optical carrier and an RF input port for receiving an RF input signal; said optical modulator having dual output ports and generating complementary modulated output signals;
   one or more tapped delay lines coupled to one or more of said dual output ports; and
   a photodetector for combining said dual output ports.

24. The RF optical signal processing system as recited in claim 23, further including an optical coupler, optically coupled to said dual output ports of said dual output optical modulator to provide complementary output signals, said complementary output signals coupled to said tapped delay lines to form positive and negative tap weights.

25. The RF optical signal processing system as recited in claim 23, wherein said one or more tapped delay lines include one or more Bragg gratings.

26. The RF optical signal processing system as recited in claim 25, further including first varying means for varying the spacing in said grating in order to vary the amplitude of the reflected light from said grating in order to provide a tapped delay line with a variable weight tap.

27. The RF optical signal processing system as recited in claim 26, wherein said varying means includes a piezo pad upon which said one or more Bragg gratings are mounted.

28. The RF optical signal processing system as recited in claim 26, wherein said varying means includes a heater pad upon which said one or more Bragg gratings are mounted.

29. The RF optical signal processing system as recited in claim 26, wherein said varying means includes a piezo pad upon which said one or more Bragg grating are mounted.

30. The RF optical processing system as recited in claim 23, further including second varying means for varying the phase of said RF signal.

31. The RF optical processing system as recited in claim 30, wherein said second varying means includes one or more Bragg gratings.

32. The RF optical processing system as recited in claim 31, wherein one or more of said Bragg gratings are disposed on a heater pad.

33. The RF optical processing system as recited in claim 31, wherein one or more of said Bragg gratings are disposed on a piezo pad.

* * * * *